United States Patent
Fujita et al.

(10) Patent No.: US 10,458,867 B2
(45) Date of Patent: Oct. 29, 2019

(54) FORCE DETECTING DEVICE AND ROBOT

(71) Applicant: FANUC CORPORATION, Yamanashi (JP)

(72) Inventors: Junya Fujita, Yamanashi (JP); Tetsuro Sakano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/190,411

(22) Filed: Nov. 14, 2018

(65) Prior Publication Data

US 2019/0162608 A1    May 30, 2019

(30) Foreign Application Priority Data

Nov. 24, 2017  (JP) ................. 2017-225490

(51) Int. Cl.
| | |
|---|---|
| *G01L 5/22* | (2006.01) |
| *G01L 5/00* | (2006.01) |
| *G01L 1/22* | (2006.01) |
| *B25J 19/02* | (2006.01) |

(52) U.S. Cl.
CPC ............. *G01L 1/2206* (2013.01); *B25J 19/02* (2013.01); *G01L 5/0076* (2013.01); *G01L 5/226* (2013.01)

(58) Field of Classification Search
CPC . G01L 5/16; G01L 1/26; G01L 5/0061; G01L 5/226; G01L 1/2206; G01L 1/005; G01L 5/166; B25J 19/02; B25J 13/085; B25J 9/0009; G05B 2219/40201; G05B 2219/40202; G01D 5/12; G01D 5/30
See application file for complete search history.

(56) References Cited

U.S. PATENT DOCUMENTS

| | | | | |
|---|---|---|---|---|
| 4,290,302 A | * | 9/1981 | Harris | ............... G01L 5/16 73/841 |
| 5,490,427 A | * | 2/1996 | Yee | ............... G01L 5/161 73/767 |
| 2011/0005338 A1 | | 1/2011 | Okada | |
| 2012/0048628 A1 | | 3/2012 | Kawanami et al. | |
| 2012/0205931 A1 | | 8/2012 | Ohta | |

(Continued)

FOREIGN PATENT DOCUMENTS

| | | |
|---|---|---|
| JP | 2602590 Y2 | 1/2000 |
| JP | 2006-021287 A | 1/2006 |

(Continued)

OTHER PUBLICATIONS

Decision to Grant a Patent dated Jun. 4, 2019, in corresponding Japanese Application No. 2017-225490; 6 pages.

*Primary Examiner* — Brandi N Hopkins
(74) *Attorney, Agent, or Firm* — Maier & Maier, PLLC (57) ABSTRACT

A force detecting device includes an installed member that is installed on an installing face and a force sensor main unit that is fixed to a top face of the installed member. The installed member has a plate-shaped or brim-shaped first portion having the top face and extending at least in a horizontal direction; a second portion extending at least downward from a bottom face side of the first portion; and a third portion extending at least in the horizontal direction from the second portion and fixed to the installing face, and a gap SP in a top-down direction is formed between the first portion and the third portion.

10 Claims, 5 Drawing Sheets

(56) References Cited

U.S. PATENT DOCUMENTS

| | | | |
|---|---|---|---|
| 2014/0028118 A1* | 1/2014 | Sakano | H02K 7/00 310/12.14 |
| 2016/0167231 A1 | 6/2016 | Nakayama et al. | |
| 2018/0133902 A1 | 5/2018 | Inoue et al. | |
| 2019/0193281 A1* | 6/2019 | Nakayama | B25J 13/085 |

FOREIGN PATENT DOCUMENTS

| | | |
|---|---|---|
| JP | 3792274 B2 | 7/2006 |
| JP | 2009-074969 A | 4/2009 |
| JP | 2012-047460 A | 3/2012 |
| JP | 5117804 B2 | 1/2013 |
| JP | 5439068 B2 | 3/2014 |
| JP | 5875382 B2 | 3/2016 |
| JP | 2016-112627 A | 6/2016 |
| JP | 2018-080941 A | 5/2018 |
| JP | 6342971 B2 | 6/2018 |

* cited by examiner

FIG. 5 ic device and robot -->

FORCE DETECTING DEVICE AND ROBOT

CROSS-REFERENCE TO RELATED APPLICATIONS

This application is based on Japanese Patent Application No. 2017-225490, the content of which is incorporated herein by reference.

FIELD

The present invention relates to force detecting devices and robots.

BACKGROUND

There are cases where a force detecting device (hereinafter also referred to as a force sensor) for detecting a force applied to a device is used in various kinds of device, such as a robot. A known type of such a force sensor that detects a force applied to a device is a six-axis sensor having a simple structure (e.g., Japanese Unexamined Patent Application, Publication No. 2009-74969).

SUMMARY

The present invention provides the following solutions.

One aspect of the present invention is directed to a force detecting device including an installed member that is attached on an installing face and a force sensor main unit fixed on a top face of the installed member, wherein, in the case where the installing face on which the installed member is attached is horizontal, the installed member includes a plate-shaped or brim-shaped first portion having the top face on a top end side thereof and extending at least in a horizontal direction, a second portion extending at least downward from a bottom face side of the first portion, and a third portion extending at least in the horizontal direction from the second portion and fixed to the installing face, and wherein a gap in a top-down direction is formed between the first portion and the third portion.

Another aspect of the present invention is directed to a robot including the force detecting device according to the above aspect.

DETAILED DESCRIPTION

A robot 10 including a force detecting device 20 according to an embodiment of the present invention will be described below with reference to the drawings.

Figure 1:
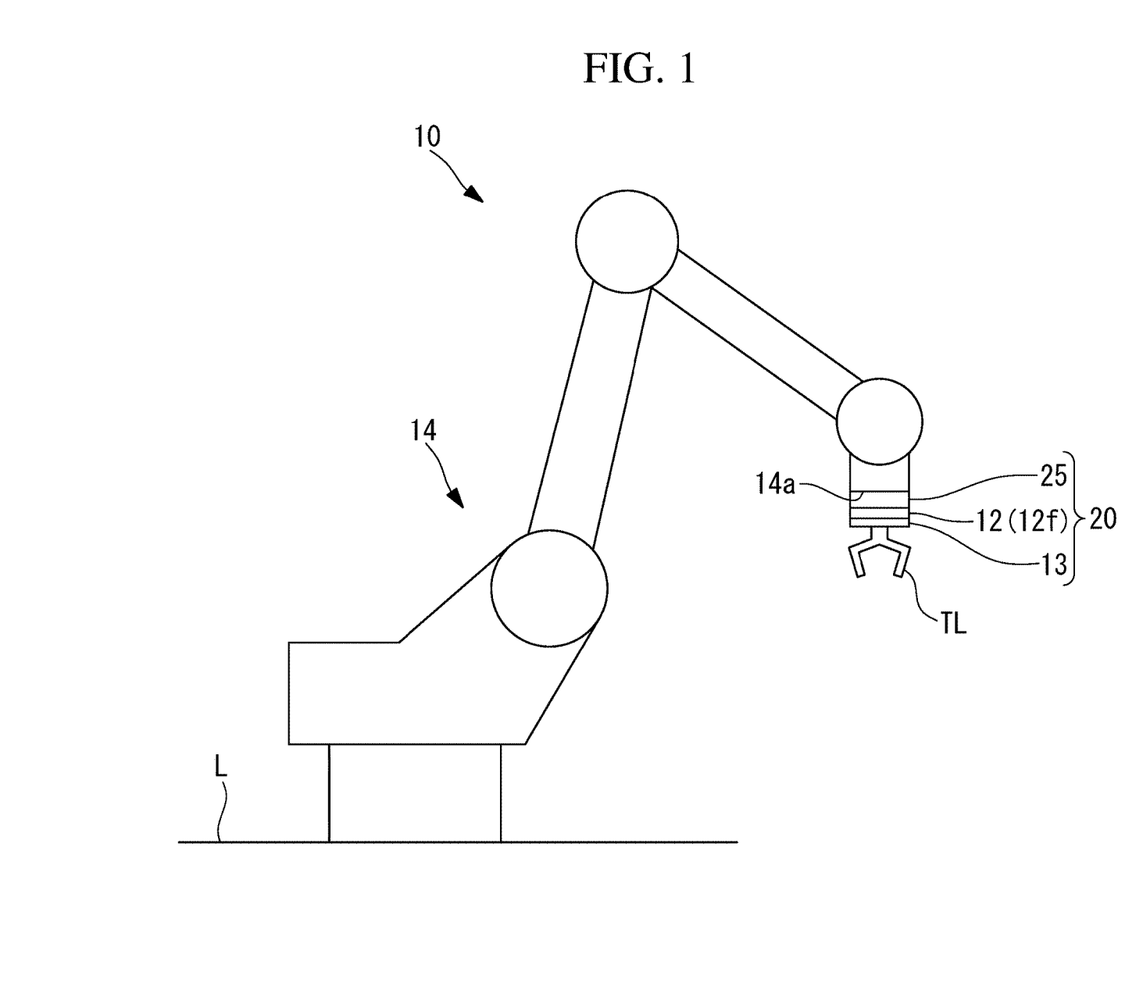
FIG. 1 is a schematic illustration of a robot according to an embodiment of the present invention.

FIG. 1 is a schematic illustration of the robot 10 according to this embodiment. The robot 10 according to this embodiment is a vertically articulated robot having a plurality of joint shafts driven by motors. At the distal end of the robot 10, a tool TL suitable for a work to be performed is attached. In this embodiment, as shown in FIG. 1, the robot 10 includes a robot body 14 that is fixed to a floor L and a force detecting device 20 that is attached to the distal end face (installing face) 14a of the robot body 14. Since the tool TL is attached to the distal end side of the force detecting device 20, which is the reverse side of the side connected to the robot body 14, the force detecting device 20 is able to detect a force applied to the tool TL.

The force detecting device 20 includes an installed member 25 that is attached to the distal end face 14a of the robot body 14, a force sensor main unit 12 that is attached to the distal end side of the installed member 25, and an attachment plate 13 that is attached to the distal end side of the force sensor main unit 12. The force sensor main unit 12 includes a strain detector, such as an electrical-resistance strain gauge, that detects the strain of the force sensor body thereof, attributable to external forces. The force sensor main unit 12 includes an external frame 12f and also includes a force detector 30 (FIG. 2) included in the frame 12f, which is not shown in FIG. 1. For example, the force sensor main unit 12 is a six-axis sensor that calculates the magnitude and direction of a force applied to the force sensor body on the basis of a signal output from the strain gauge.

Figure 2:
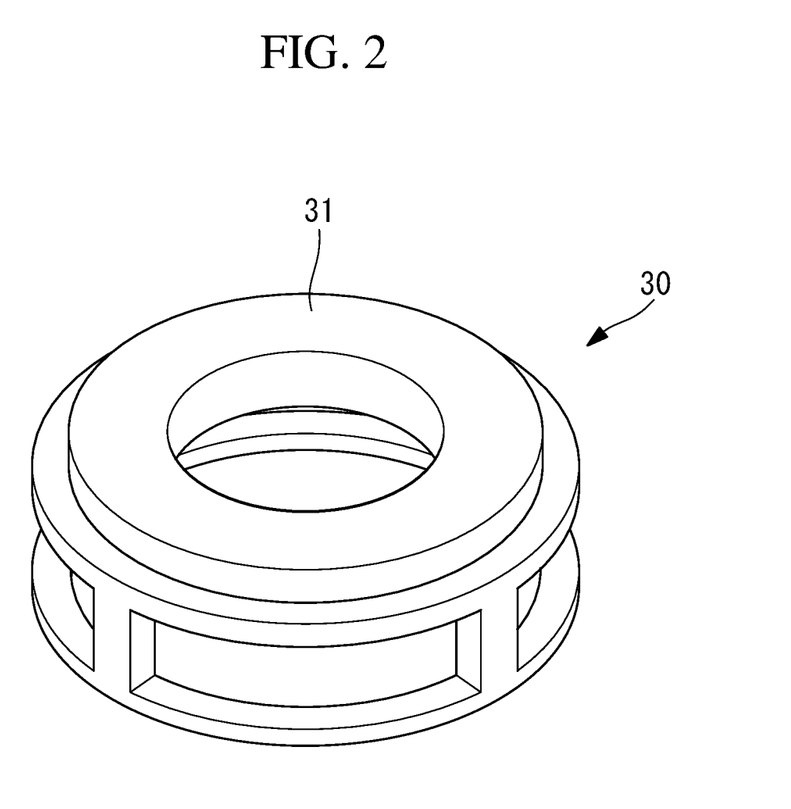
FIG. 2 is a perspective view showing an example of a force detector built into a frame of a force sensor main unit.

FIG. 2 shows an example of the force detector 30 included in the frame 12f of the force sensor main unit 12. The force detector 30 used in this embodiment includes a cylindrical force sensor body 31, which is a strain object that is strained in response to external forces and also includes a plurality of distortion gauges (not shown) that are fixed to the force sensor body 31. The external forces that are detected by the force detector 30 include a torque, a moment, etc.

Figure 3:
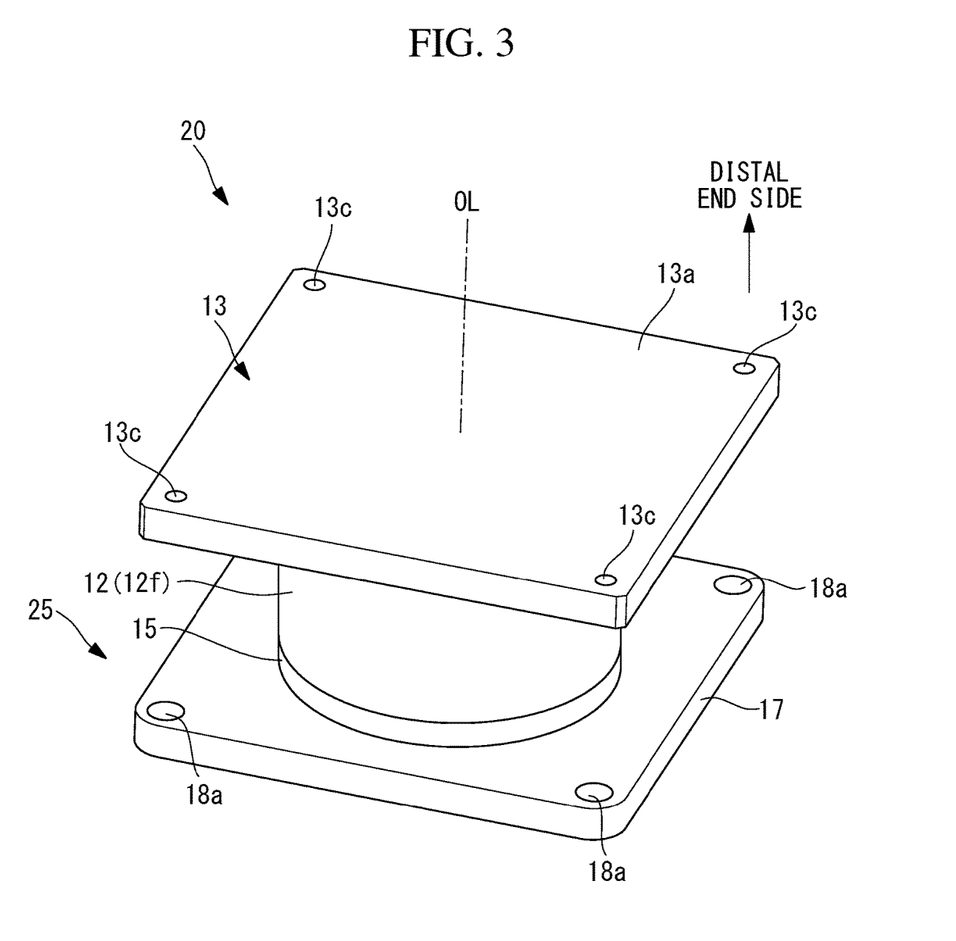
FIG. 3 is a perspective view of a force detecting device.
Figure 4:
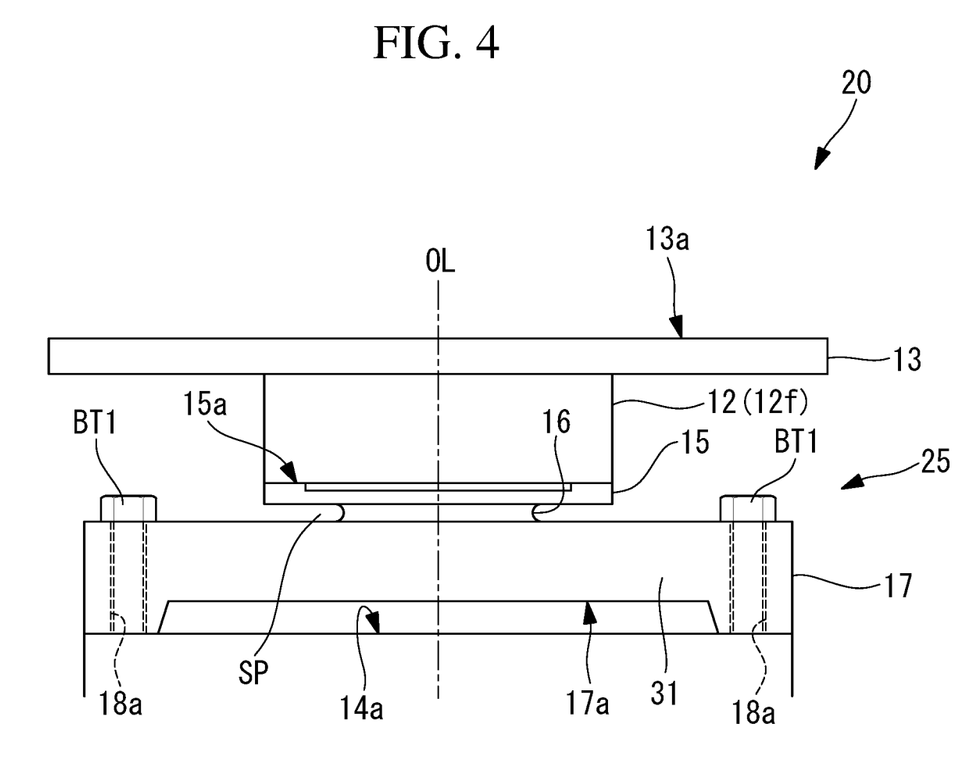
FIG. 4 is a front view of the force detecting device.

FIG. 3 shows a perspective view of the force detecting device 20, and FIG. 4 shows a front view of the force detecting device 20. In FIGS. 3 and 4, the top-down direction of the installed member 25 is defined as the direction that is perpendicular to the distal end face 14a to which the force detecting device 20 is attached, the distal end side of the installed member 25 is defined as the upper side of the installed member 25, the proximal end side of the installed member 25, on which the installed member 25 is in contact with the distal end face 14a, is defined as the lower side of the installed member 25, and the direction perpendicular to the top-down direction is defined as the horizontal direction of the installed member 25. In the case where the robot body 14 extends in an oblique direction, in the vertical direction, or the like, the same definitions are applied. That is, the top-down direction and horizontal direction in the case where the installed member 25 is installed on a horizontal installing face are defined as the top-down direction and horizontal direction of the installed member 25.

The installed member 25 is formed by machining a cast object. Alternatively, the installed member 25 may be fabricated by milling it out of a metallic block or by other methods. The installed member 25 may be fabricated as a single part in order to moderate manufacturing costs. As shown in FIG. 3, the installed member 25 includes a first portion 15 having a fixed face (top face) to which the force sensor main unit 12 is fixed and having a disk shape extending at least in the horizontal direction; a second portion 16 (FIG. 4) extending at least downward from the lower face side of the first portion 15; and a third portion 17 extending at least in the horizontal direction from the second portion 16 and fixed on the distal end face 14a of the robot body 14. As shown in FIG. 4, a gap SP in the top-down direction is formed between the first portion 15 and the third portion 17. In other words, the second portion 16 has a constriction formed along the horizontal direction, where the diameter is smaller compared with the first portion 15 and the third portion 17. In this embodiment, the constriction, i.e., the gap SP, is formed around the entire periphery about the center axis OL.

The attachment plate 13 has a rectangular shape when viewed from above. Furthermore, first bolt holes 13c for inserting bolts are formed at the four corners thereof, and the tool TL is fixed to the top face 13a of the attachment plate 13 by the bolts inserted into the first bolt holes 13c.

As shown in FIG. 3, in the third portion 17, four fastening holes 18a for inserting bolts BT1 are formed at predetermined positions along the circumferential direction about the center axis OL extending in the top-down direction of the installed member 25, including the second portion 16. As shown in FIGS. 3 and 4, the fastening holes 18a are provided on the outer side of the first portion 15 along the horizontal direction on the same circumference about the center axis OL. The fastening holes 18a are provided in the vicinity of the outer contour of the third portion 17. The vicinity the outer contour in the third portion 17 refers to the outer side of the midpoint of the straight line interconnecting the center axis OL and the outer edge of the third portion 17. As shown in FIG. 4, the bolt BT1 inserted into the fastening holes 18a are fastened with the bolt holes formed on the distal end face 14a of the robot body 14, whereby the installed member 25 including the third portion 17 is fixed on the distal end face 14a.

As shown in FIG. 4, the portion where the fastening holes 18a are formed is formed so as to extend downward compared with the other portion of the third portion 17, and the contact face on the lower side of that portion is in contact with the distal end face 14a. Thus, on the bottom face 17a of the third portion 17, where the third portion 17 faces the distal end face 14a, the portion other than the portion where the fastening holes 18a are formed is not in contact with the distal end face 14a. Furthermore, as shown in FIG. 4, the second portion 16 is located on the inner side than the first portion 15 in the horizontal direction. Accordingly, since the gap SP in the top-down direction is utilized, even if the projection of the third portion 17 in the horizontal direction is small, the stress that acts on the force sensor main unit 12 is reduced. This is advantageous in reducing the size of the installed member 25 in the horizontal direction.

The first portion 15 and the force sensor main unit 12 fixed to the top face 15a of the first portion 15 are fixed together by using a plurality of bolts in the vicinity of the outer contour near the periphery of the first portion 15. As shown in FIG. 4, the portion fixed by using the bolts is formed so as to extend upward compared with the other portion of the first portion 15, and the contact face on the upper side of that portion is in contact with the force sensor main unit 12. Thus, on the top face, where the first portion 15 faces the force sensor main unit 12, the portion other than the portion fixed by using bolts is not in contact with the force sensor main unit 12.

Figure 5:
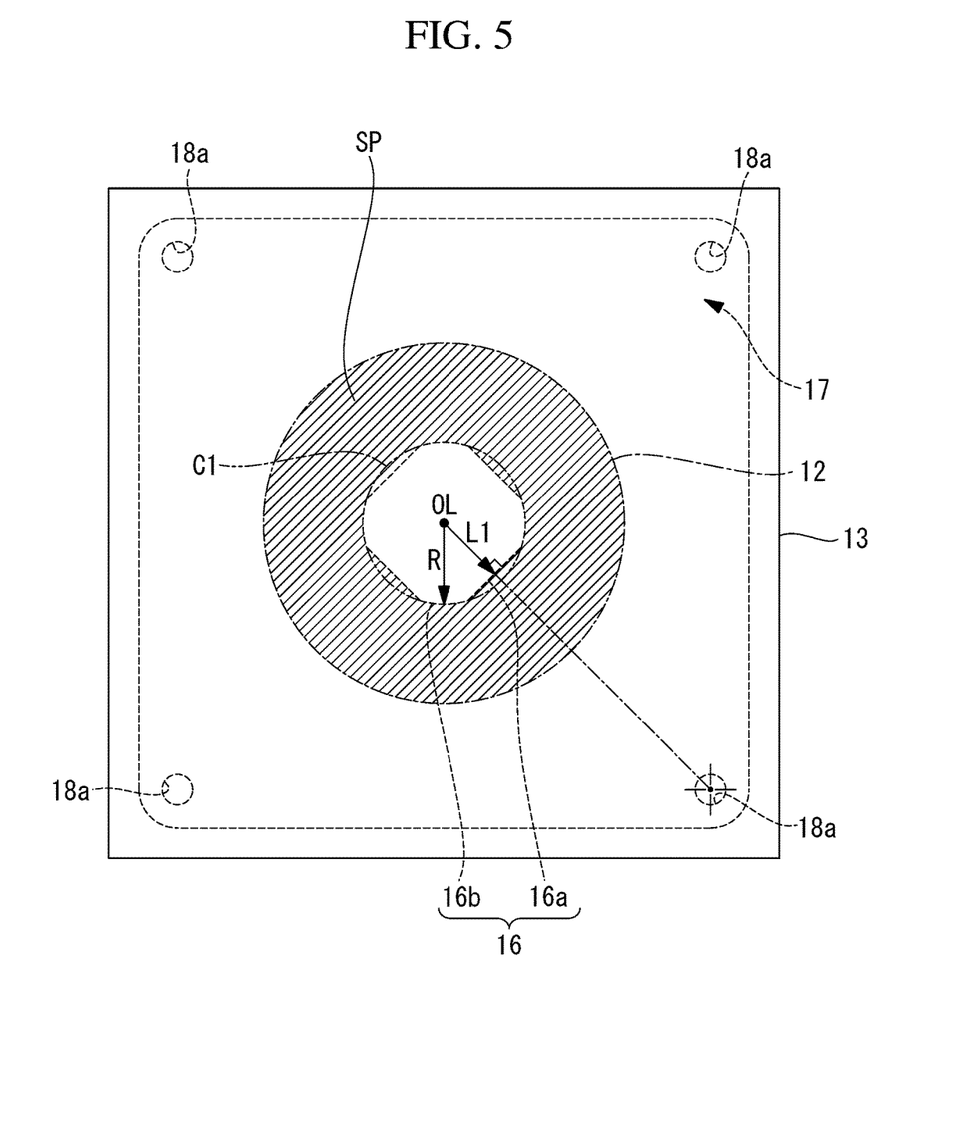
FIG. 5 is an illustration showing the force detecting device as viewed from the distal end side of the robot.

FIG. 5 shows the force detecting device 20 as viewed from the distal end side of the robot 10. In FIG. 5, in order to illustrate the shape of the second portion 16 and the gap SP (FIG. 4), the shape of the second portion 16 is indicated by a broken line, the shape of the force sensor main unit 12 is indicated by a single-dotted chain line, and the region of the gap SP is indicated by hatching.

As shown in FIG. 5, the second portion 16 has circumferential faces constituting arc portions 16b of a virtual circle C1 (double-dotted chain line) centered about the center axis OL, and also has circumferential faces disposed inside the virtual circle C1, indicated by straight line portions 16a perpendicular to the straight lines interconnecting the center axis OL and the individual centers of the plurality of fastening holes 18a. The arc portions 16b and the straight line portions 16a shown in FIG. 5 represent the positions at which the second portion 16 is connected to the first portion 15.

As shown in FIG. 5, the distances L1 from the center axis OL to the straight line portions 16a are less than the distances R (radius) from the center axis OL to the arc portions 16b. That is, the gap SP is formed in the second portion 16 such that, of the distances from the center axis OL to the circumferential faces of the second portion 16, the distances from the center axis OL to the straight line portions along the directions interconnecting the individual centers of the fastening holes 18a and the center axis OL are less than the distances from the center axis OL to the circumferential faces constituted of the arc portions 16b.

With the thus-configured robot 10 according to this embodiment, the gap SP in the top-down direction is formed between the third portion 17 fixed to the distal end face 14a of the robot body 14 and the first portion 15 in which the force sensor main unit 12 is fixed to the top face 15a thereof. The force transfer path from the circumferential portion of the third portion 17 to the first portion 15 becomes longer correspondingly to the presence of the gap SP. That is, in this embodiment, the stress generated in the third portion 17 fixed to the distal end face 14a of the robot body 14 is not easily conveyed to the first portion 15 compared with the case where the gap SP is absent. This alleviates the effect exerted on the force sensor main unit 12 by the stress generated due to strain, surface undulation, or the like on the distal end face 14a to which the third portion 17 is attached, which serves to improve the detection accuracy of the force detecting device 20. Furthermore, since the force sensor main unit 12 is installed on the distal end face 14a, the stress generated concentrates on the circumferential side of the second portion 16 constituting a portion of the gap SP. Thus, the force sensor main unit 12 fixed to the distal end face 14a via the second portion 16 becomes less susceptible to the effect of the stress generated on the distal end face 14a.

Furthermore, with the robot 10 according to this embodiment, when the installed member 25 is attached to the distal end face 14a of the robot body 14, there is no need for the work of eliminating the effects of strain, surface undulation, etc. on the distal end face 14a, and there is no need for a separate high-rigidity component for attaching the force detecting device 20, it is possible to moderate costs for attaching the force detecting device 20 to the distal end face 14a.

Furthermore, with the robot 10 according to this embodiment, the gap SP is formed at a predetermined position in the circumferential direction along which the fastening holes 18a are formed about the center axis OL. Furthermore, on the circumferential faces of the second portion 16 constituting a portion of the gap SP, the distances L1 of the straight line portions 16a along the straight lines interconnecting the center axis OL and the individual centers of the fastening holes 18a is less than the distances R (radius) of the arc portions 16b.

Although an example of the position at which the force detecting device 20 is attached to the robot 10 and an example of a device to which the force detecting device 20 is attached have been described in the context of the above embodiment, various modifications are possible for these factors. Although the force detecting device 20 is installed between the tool TL and the robot body 14 in order to detect a force applied to the tool TL in the above embodiment, the force detecting device 20 may be disposed in various places of the robot 10. For example, the force detecting device 20 may be disposed between links of the robot body 14 or between the robot body 14 and the floor L. In this case, the force detecting device 20 is able to detect a force applied to the robot body 14. Thus, in the case where the robot 10 is a cooperative robot sharing the same working range with a human worker, the force detecting device 20 detects the force of contact between the robot body 14 and the worker, which makes it possible to prevent accidents.

Furthermore, the device to which the force detecting device 20 is attached may be a device other than a robot or a robot other than a vertically articulated robot. Furthermore, the shape and size of the force detecting device 20 may be changed. Also, the attachment plate 13 fixed to the force sensor main unit 12 may be omitted or may have a different shape. Furthermore, the strain detector that detects strain on the force sensor body, attributable to external forces, is not limited to a train gauge, and a capacitive sensor, a piezoelectric sensor, a displacement sensor, or the like may be used. Furthermore, although a columnar shape is given above as an example of the shape of the frame 12f of the force sensor main unit 12, other shapes may be adopted. Furthermore, the installed member 25 and the force detector 30 built into the frame 12f of the force sensor main unit 12 may be formed integrally. This serves to reduce the manufacturing costs of the force detecting device 20.

In the above embodiment, the disk-shaped first portion 15 and the third portion 17 are included. Alternatively, the configuration may be such that only the four portions projecting outward in the horizontal direction relative to the circumferential faces of the second portion 16 (brim-shaped portions projecting outward in the horizontal direction from the circumferential faces of the second portion 16) constitute the third portion 17, only the portions projecting outward in the horizontal direction relative to the circumferential faces of the second portion 16 constitute the first portion 15, and the second portion 16 extends from the top face 15a of the first portion 15 to the bottom face 17a of the third portion 17 in the above embodiment.

In the above embodiment, as shown in FIG. 5, the third portion 17 is located on the inner side than the attachment plate 13 along the horizontal direction. Alternatively, for example, the fastening holes 18a formed in the third portion 17 may be located on the outer side than the attachment plate 13 along the horizontal direction. In this case, the distance from the distal end face 14a of the robot body 14 fastened with the bolts BT1 inserted into the fastening holes 18a to the second portion 16 becomes longer, the effect of the stress exerted on the force sensor main unit 12 by strain, surface undulation, etc. on the distal end face 14a is alleviated.

Although the fastening holes 18a are provided in the vicinity of the outer contour of the third portion 17 in the above embodiment, the fastening holes 18a need not necessarily be provided in the vicinity of the outer contour. However, in order to alleviate the effects of strain, etc. on the distal end face 14a, the fastening holes 18a should preferably be provided as close as possible to the outer contour. For example, while ensuring a thickness required in design from the inner side faces of the fastening holes 18a to the edges of the outer contour of the third portion 17, the fastening holes 18a may be provided at positions where the bolt heads do not project from the edges of the outer contour of the third portion 17 when the bolts are fastened.

Regarding the positions of the bolts for fixing the first portion 15 and the force sensor main unit 12 together, the same applies as the positions where the fastening holes 18a are provided in the third portion 17, described above. For example, the positions of through-holes in which bolts for fastening the force sensor main unit 12 are inserted should preferably be located in the vicinity of the outer contour of the first portion 15. Alternatively, the positions of the through-holes may be located on the outer side of the midpoints of the straight lines interconnecting the center axis OL and the edges of the first portion 15. For example, while ensuring a thickness required in design from the inner side faces of the through-holes to the edges of the outer contour of the first portion 15, the through-holes may be provided at positions where the heads of the bolts for fastening the force sensor main unit 12 do not project from the edges of the outer contour of the first portion 15. Furthermore, various modifications are possible for the method of fixing the first portion 15 and the force sensor main unit 12 together, and fixing methods other than using the through-holes provided in the first portion 15 and the bolt holes of the force sensor main unit 12 may be employed.

As a result, the above-described embodiment leads to the following aspects.

One aspect of the present invention provides a force detecting device including an installed member that is attached on an installing face and a force sensor main unit fixed on a top face of the installed member, wherein, in the case where the installing face on which the installed member is attached is horizontal, the installed member includes a plate-shaped or brim-shaped first portion having the top face on a top end side thereof and extending at least in a horizontal direction, a second portion extending at least downward from a bottom face side of the first portion, and a third portion extending at least in the horizontal direction from the second portion and fixed to the installing face, and wherein a gap in a top-down direction is formed between the first portion and the third portion.

According to this aspect, the second portion extends downward from the first portion, the third portion extends in the horizontal direction from the second portion, and a gap is formed in the top-down direction between the third portion fixed to the installing face and the first portion to which the force sensor main unit is fixed. Thus, the force transfer path from the third portion to the first portion becomes longer correspondingly to the presence of the gap. That is, the presence of the gap makes it difficult for the stress generated in the third portion fixed to the installing face to be conveyed to the first portion. This makes it possible to alleviate the effect exerted on the force sensor main body by the stress generated by strain, surface undulation, etc. on the installing face to which the third portion is attached, which makes it possible to realize a force detecting device having improved detection accuracy. Furthermore, since there is no need to eliminate strain on the installing face in advance or to provide a separate high-rigidity component for attaching the force detecting device, which serves to moderate costs for attaching the force detecting device.

In the above aspect, a plurality of fastening holes for fixing the third portion to the installing face may be provided at predetermined positions in the third portion in a circumferential direction about a center axis extending in the top-down direction of the second portion, and the gap may be formed between the third portion and the first portion at the predetermined positions in the circumferential direction.

In this case, the third portion and the installing face are fixed together via fastening tools inserted into the fastening holes at the predetermined positions in the circumferential direction about the center axis of the second portion, and a gap is formed between the third portion and the first portion at the predetermined positions in the circumferential direction about the center axis of the second portion. This makes it possible to further alleviate the effect exerted on the force sensor main unit by the stress generated by strain or surface undulation on the installing face.

In the above aspect, the plurality of fastening holes may be provided in the vicinity of the outer contour of the third portion.

In this case, the distances from the fastening holes for fixing the installing face to the force sensor main unit in the third portion become greater, which makes the force sensor main unit less susceptible to the effects of strain, surface undulation, etc. on the fixed installing face.

In the above aspect, the gap may be formed such that, of the distances from the center axis to circumferential faces of the second portion, the distances along the directions interconnecting the individual fastening holes and the center axis are less than the distance of the other portion.

There is a tendency that the effect exerted on the force sensor main unit by the stress generated by strain or surface undulation on the fixed installing face decreases as the stress transfer distance increases. In this aspect, the gap is formed such that the distances from the circumferential faces of the second portion to the fastening holes become greater, and as a result, the stress transfer distances from the installing face to the first portion become greater. This serves to further alleviate the effect exerted on the force sensor main unit by the stress generated on the installing face.

In the above aspect, the third portion may be located on the inner side than the first portion in the horizontal direction.

In this case, the size of the third portion along the horizontal direction becomes smaller than that of the first portion, which makes it possible to reduce the installation area of the force detecting device. Accordingly, the stress transfer distance from the third portion fixed to the installing face to the first portion becomes greater due to the gap. This serves to alleviate the effect of stress exerted on the force sensor main unit, while making it possible to reduce the size of the force detecting device.

In the above aspect, the gap may be formed along the entire circumference of the second portion.

In this case, even in the case where a large number of fastening holes are provided, the stress transfer distances to the first portion become longer for all the fastening holes. This serves to alleviate the effect of stress exerted on the force sensor main unit.

In the above aspect, in the bottom face of the third portion, a contact face that comes into contact with the installing face when the third portion is fixed to the installing face may be disposed below the other portion.

In this case, in the third portion, the contact face comes into contact with the installing face, and the other portion does not come into contact with the installing face. Thus, stress generated by strain or surface undulation on the installing face is not exerted on the portion other than the contact face in the third portion. This serves to further alleviate the effect of stress transferred from the third portion and exerted on the force sensor main unit.

In the above aspect, in the top face of the first portion, a contact face that comes into contact with the force sensor main unit when the first portion is fixed to the force sensor main unit may be disposed above the other portion.

In this case, in the first portion, the contact face comes into contact with the force sensor main unit, and the other portion does not come into contact with the force sensor main unit. Thus, stress generated by strain or surface undulation in the portion other than the contact face in the first portion is prevented from being transferred to the force sensor main unit. This serves to further alleviate the effect of stress exerted on the force sensor main unit by the first portion.

In the above aspect, the force sensor main unit may include a force detector that is able to detect a force and a frame that covers the force detector, and the force detector may be formed integrally with the installed member.

This makes it possible to integrate the force detector and the installed member, which serves to reduce the manufacturing costs of the force detecting device.

Another aspect of the present invention provides a robot including the force detecting device according to the above aspect.

According to this aspect, the force sensor main unit attached to the robot detects a force applied to the robot. With this robot, the error in the detected force is small since the effect of stress generated by strain or surface undulation on the installing face to which the force detecting device is fixed is small.

The present invention makes it possible to provide a force detecting device that is insusceptible to the effect of strain on a place of attachment, as well as a robot including the same.

REFERENCE SIGNS LIST

10 Robot
12 Force sensor main unit
14 Robot body
14a Distal end face (installing face) of robot body
15 First portion
15a Top face
16 Second portion
17 Third portion
18a Fastening hole
20 Force detecting device
25 Installed member
SP Gap

The invention claimed is:

1. A force detecting device comprising: an installed member that is attached on an installing face and a force sensor main unit fixed on a top face of the installed member,
  wherein, in the case where the installing face on which the installed member is attached is horizontal, the installed member includes a plate-shaped or brim-shaped first portion having the top face on a top end side thereof and extending at least in a horizontal direction, a second portion extending at least downward from a bottom face side of the first portion, and a third portion extending at least in the horizontal direction from the second portion and fixed to the installing face, and
  wherein a gap in a top-down direction is formed between the first portion and the third portion.

2. A force detecting device according to claim 1,
  wherein a plurality of fastening holes for fixing the third portion to the installing face is provided at a plurality of predetermined positions in the third portion in a circumferential direction about a center axis extending in the top-down direction of the second portion, and
  wherein the gap is formed between the third portion and the first portion at the plurality of predetermined positions in the circumferential direction.

3. A force detecting device according to claim 2, wherein the plurality of fastening holes are provided in a vicinity of an outer contour of the third portion.

4. A force detecting device according to claim 3, wherein the gap is formed such that, of the distances from the center axis to circumferential faces of the second portion, the distances along the directions interconnecting the individual fastening holes and the center axis are less than the distances of the other portion.

5. A force detecting device according to claim 2, wherein the third portion is located on an inner side than of the first portion in the horizontal direction.

6. A force detecting device according to claim 1, wherein the gap is formed along an entire circumference of the second portion.

7. A force detecting device according to claim 1, wherein, in the bottom face of the third portion, a contact face that comes into contact with the installing face when the third portion is fixed to the installing face is disposed below the other portion.

8. A force detecting device according to claim 1, wherein, in the top face of the first portion, a contact face that comes into contact with the force sensor main unit when the first portion is fixed to the force sensor main unit is disposed above the other portion.

9. A force detecting device according to claim 1,
wherein the force sensor main unit includes a force detector that is capable of detecting a force and a frame that covers the force detector, and
wherein the force detector is formed integrally with the installed member.

10. A robot having a force detecting device, comprising:
an installed member that is attached on an installing face and a force sensor main unit fixed on a top face of the installed member,
wherein, in the case where the installing face on which the installed member is attached is horizontal, the installed member includes a plate-shaped or brim-shaped first portion having the top face on a top end side thereof and extending at least in a horizontal direction, a second portion extending at least downward from a bottom face side of the first portion, and a third portion extending at least in the horizontal direction from the second portion and fixed to the installing face, and
wherein a gap in a top-down direction is formed between the first portion and the third portion.

\* \* \* \* \*